UNITED STATES PATENT OFFICE.

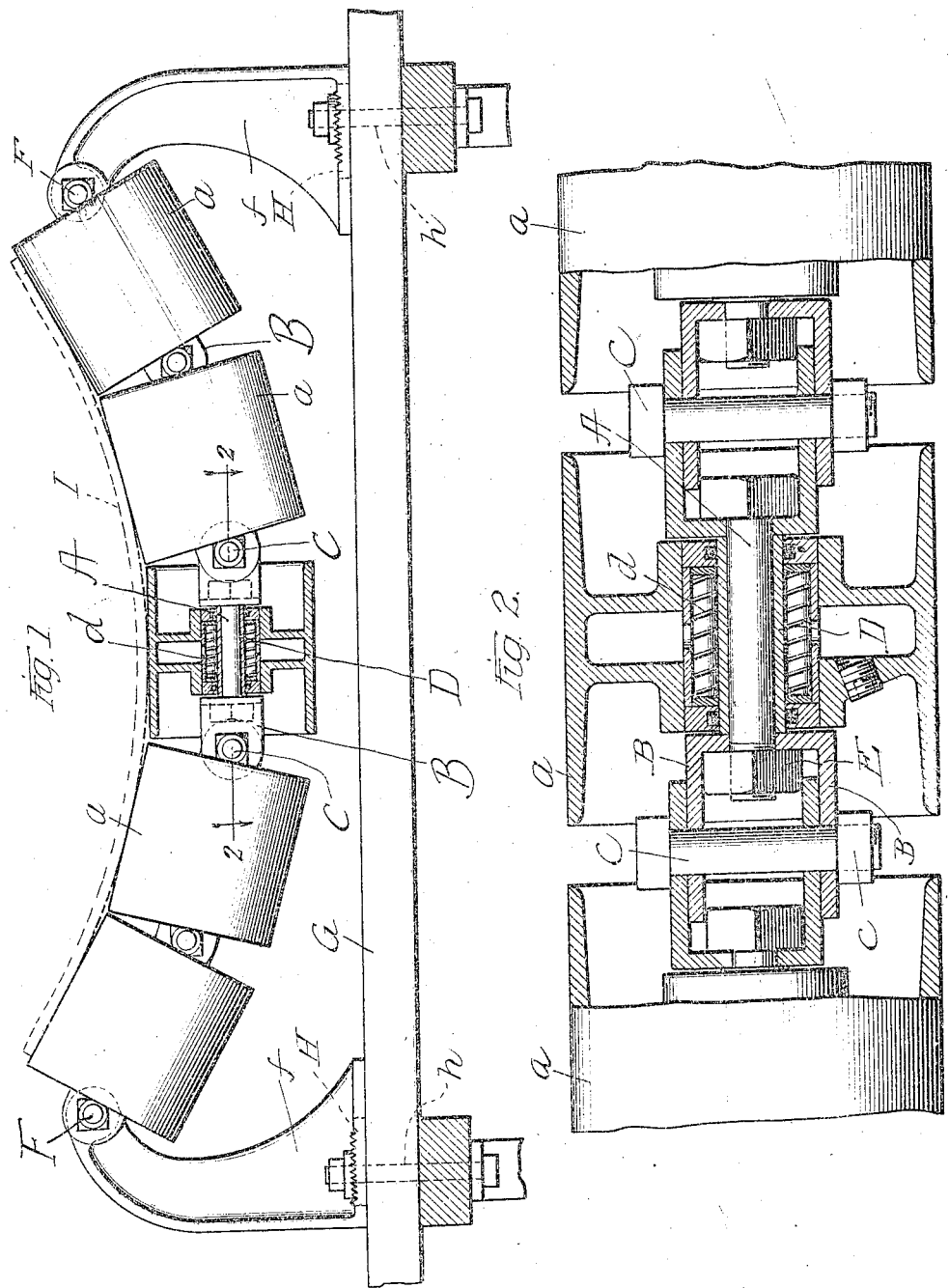

RAYMOND W. DULL, OF LA GRANGE, ILLINOIS.

TROUGHING BELT-PULLEY.

1,295,138.  Specification of Letters Patent.  Patented Feb. 25, 1919.

Application filed October 12, 1916.  Serial No. 125,139.

*To all whom it may concern:*

Be it known that I, RAYMOND W. DULL, a citizen of the United States of America, and resident of La Grange, Cook county, Illinois, have invented a certain new and useful Improvement in Troughing Belt-Pulleys, of which the following is a specification.

My invention relates to troughing belt-pulleys or idlers for supporting the conveyer-belts which are used for carrying materials from one place to another.

The object of my invention is to provide an improved construction and arrangement whereby cylindric pulleys may be used, each pulley or idler being composed of sections which are hinged together through the medium of their arbors, thus not only obviating the necessity of concaving the periphery of the pulleys in order to give the belt the form of a trough, but also permitting adjustment to vary the depth of the trough formed in the belt, and insuring other advantages, as will hereinafter more fully appear.

It is also an object to provide certain details and features of construction and combinations tending to increase the general efficiency and desirability of a troughing belt-pulley or idler of this particular character.

To the foregoing and other useful ends, my invention consists in matters hereinafter set forth and claimed.

In the accompanying drawings:—

Figure 1 is a side elevation of a troughing belt-pulley constructed in accordance with my invention.

Fig. 2 is an enlarged section on line 2—2 in Fig. 1.

As thus illustrated, my invention comprises an articulated support comprising a series of bolts A which form the stationary axes of the rotary pulley-sections $a$, the latter being provided with cylindric peripheries. These bolts are connected together by U-shaped members B, there being one of these members for each end of each bolt, and said members being connected together by pivot-bolts C or any other suitable means. Each bolt A is provided with a sleeve D which forms a bearing for the pulley-section which rotates thereon, and as shown rollers $d$ are interposed between this sleeve and the pulley-section, thereby providing a roller-bearing. By tightening the nuts E of the bolts A the sleeves D will be clamped endwise between the U-shaped members B, so that the sleeves will not rotate with the pulley-sections. It will be understood, of course, that the roller-bearings can be omitted, if such is desired, or that any other suitable form of bearing can be employed.

When the bolts A are adjusted to the desired angles, relative to each other, the nuts $c$ of the bolts C are then tightened, thus holding the bolts A firmly in their relative positions, and thereby providing stationary axes for the different pulley-sections.

The ends of the articulated support or series of axes thus provided for the pulley-sections are supported by bolts F inserted through the upper ends of the bracket-supports $f$, which latter are in turn supported on a base G or any other suitable support. In order that the desired troughing effect may be obtained, by relative adjustment of the different pulley-sections $a$ about their pivot-bolts C, the brackets $f$ are provided with slots H for the fastening bolts $h$, whereby these two brackets can be adjusted toward and away from each other and firmly clamped in adjusted position.

With the foregoing construction, the conveyer-belt I, shown in dotted lines in Fig. 1, will rest on the pulley-sections $a$, and will be substantially concave in cross-section, thus producing the desired troughing effect necessary for a conveyer of this character. It will be seen, however, that this is accomplished without the necessity of using belt-pulleys having concave peripheries. To the contrary, straight pulley-sections $a$ are used instead, having cylindric peripheries, and the substantially concave or trough-like shape of the belt is obtained by arranging these pulley-sections at different angles, so that the general effect is to raise the sides of the belt and leave it depressed at the center. The belt can be made either shallow or deep, according to the requirements, by loosening the nuts $c$ and adjusting the brackets $f$ toward and away from each other. The pulley-sections $a$ are arranged relative to each other in such a manner that they will not engage each other.

The pulley-sections $a$ constitute, it will be seen, a sectional unit, as these sections really combine to form one unitary pulley or idler, as distinguished from a plurality of separate and distinct pulleys or idlers. The intermediate sections are supported by the arbors A of the end sections, and these arbors are pivotally connected together to form a sort of chain or link-belt which is flexible up and down, and upon which the pulley-sections are supported for rotation. When the nuts $c$ are loose, the string of pulley-sections will hang like a rope or chain which is suspended only at its ends, and will have the catenary curve of said chain or rope, which is simply the natural sag or curve of a flexible member when thus supported at its ends. This catenary curve is then maintained by the tightening of the nuts $c$, and the conveyer-belt, in cross-section, will then have substantially the same curve.

Furthermore, with a sectional belt-pulley or idler of this character, the length of the pulley can be changed at will, to make it either shorter or longer, according to the width of the belt. For a wider belt, one or more sections can be added, by simply disconnecting the pulley at one end of its flexible axis from the bracket $f$, and by then connecting one or more additional sections in place. For a narrower belt, the pulley can be reduced in length, by removing one or more of the sections.

What I claim as my invention is:—

1. A troughing belt-pulley comprising a series of pulley-sections provided with arbors which are hinged together at their ends to provide a sectional pulley which in effect is flexible to vary the troughing effect thereof, and means to support the series of arbors only at the ends thereof, thereby permitting said series to assume a catenary curve, and means to maintain said curve.

2. A troughing belt-pulley comprising a series of pulley-sections having cylindric peripheries, and means for connecting and supporting the pulley-sections in position to form a catenary curve for troughing the belt, having provisions between the sections to maintain said curve.

3. A troughing belt-pulley as specified in claim 2, said means and provisions including a series of cylindric members pivotally connected together at their ends to provide individual axes for said pulley-sections, devices to rigidly connect and hold said members in relatively adjusted position to prevent up and down movement thereof, and supports for the ends of said means.

4. A troughing belt-pulley as specified in claim 2, said provisions and means including a series of bolts, U-shaped members for the ends of said bolts, devices to pivotally connect together said U-shaped members, means to tighten said devices to hold said members against relative movement, and means on said bolts to provide bearings for said pulley-sections.

5. A troughing belt-pulley as specified in claim 2, said means and provisions being adapted for pivotally adjusting said pulley-sections relative to each other, thereby to increase or reduce the troughing effect, and retaining means to hold the sections in relatively adjusted condition.

6. A troughing belt-pulley as specified in claim 2, said means including a series of pulley-bearings which are pivotally connected together for relative adjustment about parallel axes extending at right angles to the individual axes of the pulley-sections.

7. A troughing belt-pulley comprising a series of pulley-sections provided with arbors which are hinged together at their ends to provide a sectional pulley which in effect is flexible to produce the troughing effect thereof, and accessible means to rigidly and removably connect the arbors together, said arbors thereby being detachable from each other for permitting removal of one or more pulley-sections to shorten the belt-pulley in its entirety, and supports for the ends of the flexible axle formed by said arbors.

8. A troughing belt-pulley comprising a series of pulley-sections having cylindric peripheries, means for connecting and supporting the pulley-sections in position to form a catenary curve for troughing the belt, and means disposed between the sections and adapted to be tightened after said curve is established, thereby to prevent up and down movement thereof.

Signed by me at Chicago, Illinois, this 9th day of October, 1916.

RAYMOND W. DULL.